(12) United States Patent
Al Shehri et al.

(10) Patent No.: US 11,761,909 B2
(45) Date of Patent: Sep. 19, 2023

(54) NANOSENSOR COUPLED WITH RADIO FREQUENCY FOR PUMP CONDITION MONITORING

(71) Applicant: Saudi Arabian Oil Company, Dhahran (SA)

(72) Inventors: Ali Al Shehri, Thuwal (SA); Keith William Brashler, Dhahran (SA); Doru Catalin Turcan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 24 days.

(21) Appl. No.: 17/333,597

(22) Filed: May 28, 2021

(65) Prior Publication Data

US 2022/0381704 A1    Dec. 1, 2022

(51) Int. Cl.
| | |
|---|---|
| *G01N 22/02* | (2006.01) |
| *F04D 27/00* | (2006.01) |
| *G08B 21/18* | (2006.01) |
| *F04D 25/06* | (2006.01) |

(52) U.S. Cl.
CPC ........... *G01N 22/02* (2013.01); *F04D 27/001* (2013.01); *G08B 21/18* (2013.01); *F04D 25/0606* (2013.01)

(58) Field of Classification Search
CPC ........... G01N 2291/106; G01N 29/036; G01N 29/2481
See application file for complete search history.

(56) References Cited

U.S. PATENT DOCUMENTS

| | | |
|---|---|---|
| 2,086,806 A | 7/1937 | Aladar |
| 6,567,709 B1 | 5/2003 | Malm et al. |
| 8,401,806 B2 | 3/2013 | Borsting et al. |
| 9,863,476 B2 | 1/2018 | Gray |
| 11,378,491 B2 | 7/2022 | Decook |
| 2002/0045921 A1* | 4/2002 | Wolinsky ........... A61N 1/37217 607/61 |

(Continued)

OTHER PUBLICATIONS

Emerson Reliability Solutions, "A0710GP Industrial Accelerometer," Specifications Sheet, Jun. 2017, 2 pages.

(Continued)

*Primary Examiner* — Jermele M Hollington
*Assistant Examiner* — Temilade S Rhodes-Vivour
(74) *Attorney, Agent, or Firm* — Fish & Richardson P.C.

(57) ABSTRACT

A sensor includes a radio frequency interrogator, a responsive patch, a radio frequency resonance detector, and a transmission line. The radio frequency interrogator is configured to produce an electromagnetic interrogation pulse having a first frequency. The responsive patch includes a substrate and a resonant layer disposed on a surface of the substrate. The substrate includes a polymer. The resonant layer includes an electrically conductive nanomaterial. The resonant layer is configured to resonate at the first frequency in response to receiving the electromagnetic interrogation pulse. The radio frequency resonance detector is configured to detect a resonating response of the responsive patch. The transmission line couples the responsive patch to the radio frequency resonance detector. The transmission line is configured to transmit the resonating response of the responsive patch to the radio frequency resonance detector.

17 Claims, 6 Drawing Sheets

(56) References Cited

U.S. PATENT DOCUMENTS

| | | | |
|---|---|---|---|
| 2002/0177782 A1* | 11/2002 | Penner | A61B 8/56 |
| | | | 600/485 |
| 2006/0266913 A1 | 11/2006 | McCoy et al. | |
| 2008/0015421 A1* | 1/2008 | Penner | A61N 1/3787 |
| | | | 600/300 |
| 2008/0293446 A1* | 11/2008 | Rofougaran | H01L 25/0657 |
| | | | 455/552.1 |
| 2012/0181965 A1 | 7/2012 | Chamberlin | |
| 2013/0342362 A1 | 12/2013 | Martin | |
| 2014/0260523 A1 | 9/2014 | Peczalski | |
| 2016/0290126 A1 | 10/2016 | Rendusara | |
| 2017/0167245 A1 | 6/2017 | Dickenson | |
| 2018/0051700 A1 | 2/2018 | Sheth | |
| 2018/0180056 A1 | 6/2018 | Zolotukhin | |
| 2019/0156600 A1 | 5/2019 | Potyrailo | |
| 2019/0317488 A1 | 10/2019 | Al-Maghlouth et al. | |
| 2019/0326906 A1 | 10/2019 | Camacho Cardenas | |
| 2020/0089217 A1 | 3/2020 | Celia et al. | |
| 2020/0224745 A1 | 7/2020 | Landig | |
| 2021/0027606 A1 | 1/2021 | Al-Meqbel et al. | |
| 2021/0229503 A1* | 7/2021 | Stowell | C08K 3/045 |
| 2021/0348909 A1* | 11/2021 | Stowell | G01B 7/16 |
| 2022/0381134 A1 | 12/2022 | Al Shehri et al. | |
| 2022/0381254 A1 | 12/2022 | Brashler et al. | |

OTHER PUBLICATIONS

Abdulelah et al., "Pipe Strain Effects on Pumps—Case Study" SPE-203428-MS, Society of Petroleum Engineers, paper presented at the Abu Dhabi International Petroleum Exhibition & Conference, Abu Dhabi, UAE, Nov. 2020, 13 pages.

* cited by examiner

NANOSENSOR COUPLED WITH RADIO FREQUENCY FOR PUMP CONDITION MONITORING

TECHNICAL FIELD

This disclosure relates to condition monitoring of pumps.

BACKGROUND

In the oil and gas industry, vertically suspended charge pumps are widely used to boost pressure of fluid to satisfy net positive suction head (NPSH) requirements before the fluid enters the inlets of the main pumps. Due to the nature of operation of these vertical charge pumps, they are known to fail for a variety of reasons in various locations along the pump. Equipment maintenance and replacement can incur high operating and capital costs. Further, such equipment maintenance and replacement can incur costs associated with unit downtime and/or production cut-backs. Extending the operating life of critical equipment and ensuring their reliability in operations can be useful and important to inspection and maintenance engineers. Information from sensing and monitoring instrumentation and diagnostic testing are often relied upon to ascertain the status and operating conditions of such assets.

SUMMARY

This disclosure describes technologies relating to condition monitoring of pumps. Certain aspects of the subject matter described can be implemented as a sensor. The sensor includes a radio frequency interrogator, a responsive patch, a radio frequency resonance detector, and a transmission line. The radio frequency interrogator is configured to produce an electromagnetic interrogation pulse having a first frequency. The responsive patch includes a substrate and a resonant layer disposed on a surface of the substrate. The substrate includes a polymer. The resonant layer includes an electrically conductive nanomaterial. The resonant layer is configured to resonate at the first frequency in response to receiving the electromagnetic interrogation pulse. The radio frequency resonance detector is configured to detect a resonating response of the responsive patch. The transmission line couples the responsive patch to the radio frequency resonance detector. The transmission line is configured to transmit the resonating response of the responsive patch to the radio frequency resonance detector.

This, and other aspects, can include one or more of the following features.

In some embodiments, the electrically conductive nanomaterial includes carbon nanotubes or silver nanoparticles. In some embodiments, the electrically conductive nanomaterial of the resonant layer is coated on the substrate.

In some embodiments, the substrate includes solid copper. In some implementations, the polymer is polydimethylsiloxane.

In some embodiments, the resonant layer is disposed in an electrically insulating matrix. In some embodiments, the electrically insulating matrix includes poly(methyl methacrylate). In some embodiments, the electrically insulating matrix is disposed on the substrate.

In some embodiments, a thickness of the resonant layer varies along a first dimension. In some embodiments, a length of the resonant layer varies along a second dimension.

In some embodiments, the sensor includes a computer system communicatively coupled to the radio frequency resonance detector. In some embodiments, the computer system includes one or more processors and a non-transitory computer-readable storage medium coupled to the one or more processors. In some embodiments, the storage medium stores programming instructions for executing by the one or more processors, and the programming instructions instruct the one or more processors to perform operations. In some embodiments, the operations include receiving the resonating response from the radio frequency resonance detector. In some embodiments, the operations include processing the resonating response to determine a vibrational strain of the resonant layer. In some embodiments, the operations include comparing the determined vibrational strain with multiple vibrational strain signatures to determine whether the determined vibrational strain matches any one of the vibrational strain signatures. In some embodiments, the operations includes transmitting a warning message in response to determining that the determined vibrational strain of the resonant layer matches any one of the vibrational strain signatures. In some embodiments, the computer system is communicatively coupled to the radio frequency interrogator. In some embodiments, the operations include causing the radio frequency interrogator to produce the electromagnetic interrogation pulse having the first frequency.

Certain aspects of the subject matter described can be implemented as a method. An electromagnetic interrogation pulse having a first frequency is produced by a radio frequency interrogator. The electromagnetic interrogation pulse from the radio frequency interrogator is received by a resonant layer of a responsive patch. The resonant layer resonates at the first frequency in response to receiving the electromagnetic interrogation pulse. The responsive patch includes a substrate. The resonant layer is disposed on a surface of the substrate. The substrate includes a polymer. The resonant layer includes an electrically conductive nanomaterial. A resonating response of the responsive patch is transmitted to a radio frequency resonance detector by a transmission line that couples the responsive patch to the radio frequency resonance detector. The resonating response of the responsive layer is detected by the radio frequency resonance detector.

This, and other aspects, can include one or more of the following features.

In some embodiments, the electrically conductive nanomaterial includes carbon nanotubes or silver nanoparticles. In some embodiments, the polymer is polydimethylsiloxane. In some embodiments, the electrically conductive nanomaterial of the resonant layer is coated on the substrate.

In some embodiments, the resonant layer is disposed in an electrically insulating matrix. In some embodiments, the electrically insulating matrix includes poly(methyl methacrylate). In some embodiments, the electrically insulating matrix is disposed on the substrate.

In some embodiments, one or more processors cause the radio frequency interrogator to produce the electromagnetic interrogation pulse having the first frequency. In some embodiments, the resonating response from the radio frequency resonance detector is received by the one or more processors. In some embodiments, the resonating response is processed by the one or more processors to determine a vibrational strain of the resonant patch. In some embodiments, the determined vibrational strain is compared by the one or more processors with multiple vibrational strain signatures to determine whether the determined vibrational strain matches any one of the vibrational strain signatures. In some embodiments, a warning message is transmitted by the one or more processors in response to determining that the determined vibrational strain of the resonant layer matches any one of the vibrational strain signatures.

Certain aspects of the subject matter described can be implemented as a system. The system includes a vertical charge pump and a sensor. The vertical charge pump is configured to boost pressure of crude oil in crude oil transportation. The sensor includes a radio frequency interrogator, a responsive patch, a radio frequency resonance detector, a transmission line, and a computer system. The radio frequency interrogator is configured to produce an electromagnetic interrogation pulse having a first frequency. The responsive patch is disposed on a surface of the vertical charge pump. The responsive patch includes a substrate and a resonant layer. The substrate includes a polymer. The resonant layer is disposed in an electrically insulating matrix. The electrically insulating matrix is disposed on a surface of the substrate. The resonant layer includes an electrically conductive nanomaterial. The resonant layer is configured to resonate at the first frequency in response to receiving the electromagnetic interrogation pulse. The radio frequency resonance detector is configured to detect a resonating response of the responsive patch. The transmission line couples the responsive patch to the radio frequency resonance detector. The transmission line is configured to transmit the resonating response of the responsive patch to the radio frequency resonance detector. The computer system is communicatively coupled to the radio frequency interrogator and the radio frequency resonance detector. The computer system includes one or more processors and a non-transitory computer-readable storage medium coupled to the one or more processors. The storage medium stores programming instructions for execution by the one or more processors. The programming instructions instruct the one or more processors to perform operations. The operations include causing the radio frequency interrogator to produce the electromagnetic interrogation pulse having the first frequency. The operations include receiving the resonating response from the radio frequency resonance detector. The operations include processing the resonating response to determine a vibrational strain of the resonant layer. The operations include comparing the determined vibrational strain with multiple vibrational strain signatures to determine whether the determined vibrational strain matches any one of the vibrational strain signatures. The operations include transmitting a warning message in response to determining that the determined vibrational strain of the resonant layer matches any one of the vibrational strain signatures, indicating that the vertical charge pump is in a warning condition.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes condition monitoring of pumps, and more specifically, vibration sensing during pump operation. A vibration sensor is disposed on an operating equipment, such as a pump. The vibration sensor includes a responsive layer that produces a resonating response in response to a radio frequency (RF) signal. An RF resonance detector detects the resonating response of the responsive patch to determine whether the operating equipment is operating at a condition that is within normal operating conditions or in a failure/warning mode.

The subject matter described in this disclosure can be implemented in particular implementations, so as to realize one or more of the following advantages. The vibration sensor can be implemented, for example, on "closed suction" or "canned" (sealless) pumps. The vibration sensor can be implemented, for example, on "open suction" (conventionally sealed) pumps. The vibration sensor can be implemented on vertical crude charge pumps for conditioning monitoring, which can be used to flag operational issues (such as pump failure modes) as they arise. Early detection of failure modes can significantly reduce maintenance costs, increase availability of equipment, and allow for proper scheduling and maintenance planning efforts. Vibrations of various components of an operating pump can be identified and monitored, allowing for condition monitoring of the various components, including, for example, a first-stage impeller and a bottom bearing/bushing location. The vibration sensor includes nanoscale materials that interact with RF techniques, which can enhance sensitivity of vibration sensing and can also allow for low-temperature sintering fabrication on stretchable polymer substrates. Vibrational anomalies from multiple, different regions of a pump can be detected and amplified for enhanced sensing using a single vibration sensor (located, for example, near the first-stage impeller proximate to the inlet) due to the sensitivity of vibration sensing of the nanoscale materials.

Figure 1A:
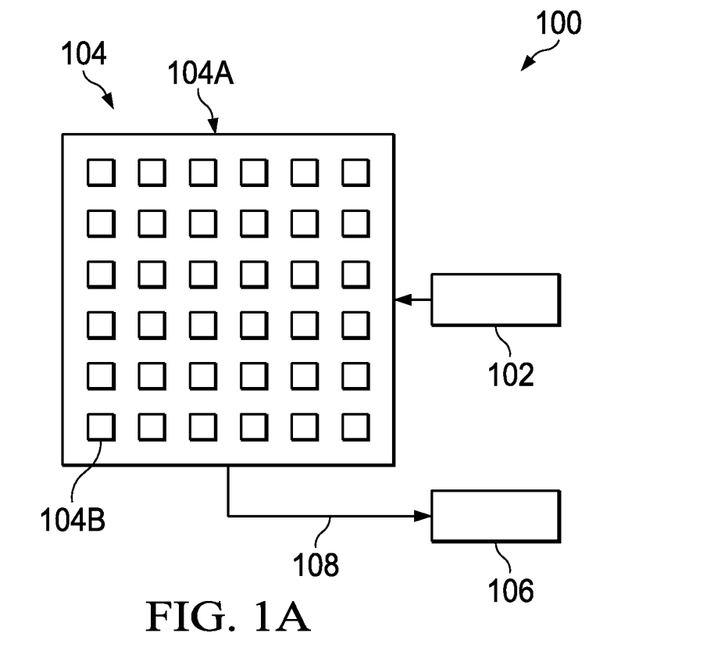
FIG. 1A is a schematic diagram of an example vibration sensor.

Referring to FIG. 1A, vibration sensor 100 includes an RF interrogator 102, a responsive patch 104, an RF resonance detector 106, and a transmission line 108. The responsive patch 104 includes a substrate 104a and a resonant layer 104b. The resonant layer 104b is disposed on a surface of the substrate 104a. The transmission line 108 couples the responsive patch 104 to the RF resonance detector 106.

The RF interrogator 102 is configured to produce an electromagnetic interrogation pulse having a first frequency. The first frequency can be in a range of from about 300 megahertz (MHz) to about 1,000 gigahertz (GHz), from about 300 MHz to about 500 GHz, from about 300 MHz to about 300 GHz, from about 300 MHz to about 100 GHz, or from about 1 GHz to about 60 GHz.

The responsive patch 104 includes a nanoscale polymer composite material. For example, the responsive patch 104 includes a composite material that includes a polymer and a nanomaterial. In some embodiments, the substrate 104a includes a solid metal. For example, the substrate 104a includes solid copper. In some embodiments, the substrate 104a includes a stretchable polymer. For example, the substrate 104a includes a silicone, such as polydimethylsiloxane (PDMS). The resonant layer 104b includes an electrically conductive nanomaterial and is configured to resonate at the first frequency in response to receiving the electromagnetic interrogation pulse from the RF interrogator 102. For example, the shape and/or dimensions of the resonant layer 104b including the electrically conductive nanomaterial can be adjusted, such that the resonant layer 104b resonates at the first frequency. In some embodiments, a thickness of the resonant layer 104b varies along a first dimension, a length of the resonant layer 104b varies along a second dimension, a width of the resonant layer 104b varies along a third dimension, or any combination of these. In some embodiments, the electrically conductive nanomaterial includes carbon nanotubes (CNT), silver nanoparticles, or a combination of these. The CNT, silver nanoparticles, or both can be disposed on the substrate 104a (for example, the stretchable polymer substrate). In some embodiments, the electrically conductive nanomaterial is disposed in an electrically insulating matrix (for example, made of poly(methyl methacrylate) (PMMA)), which is disposed on the substrate 104a made of a stretchable polymer (for example, PDMS).

Figure 2A:
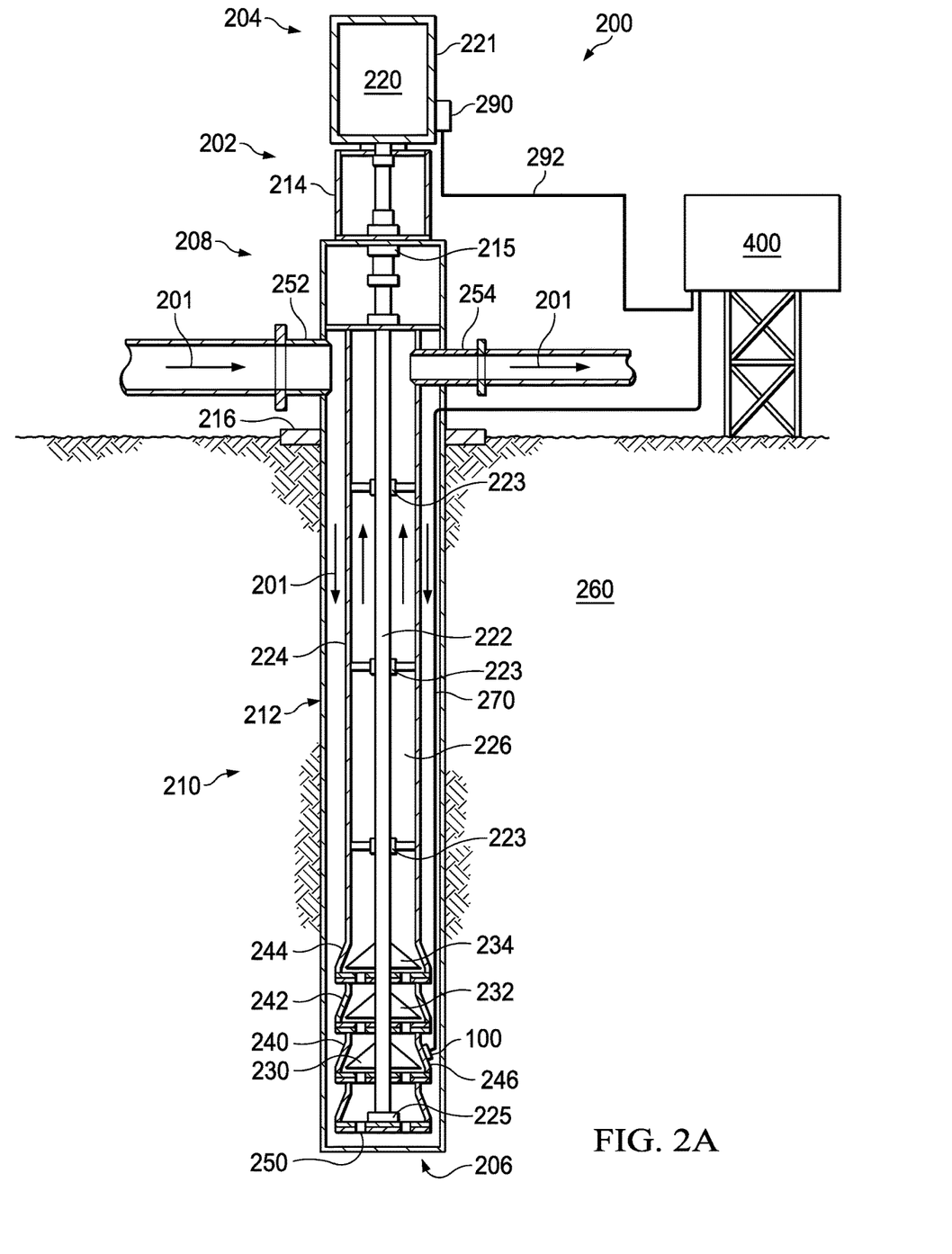
FIG. 2A is a schematic diagram of an example vertical charge pump vibration monitoring system, including the vibration sensor and computer system of FIG. 1B.
Figure 2B:
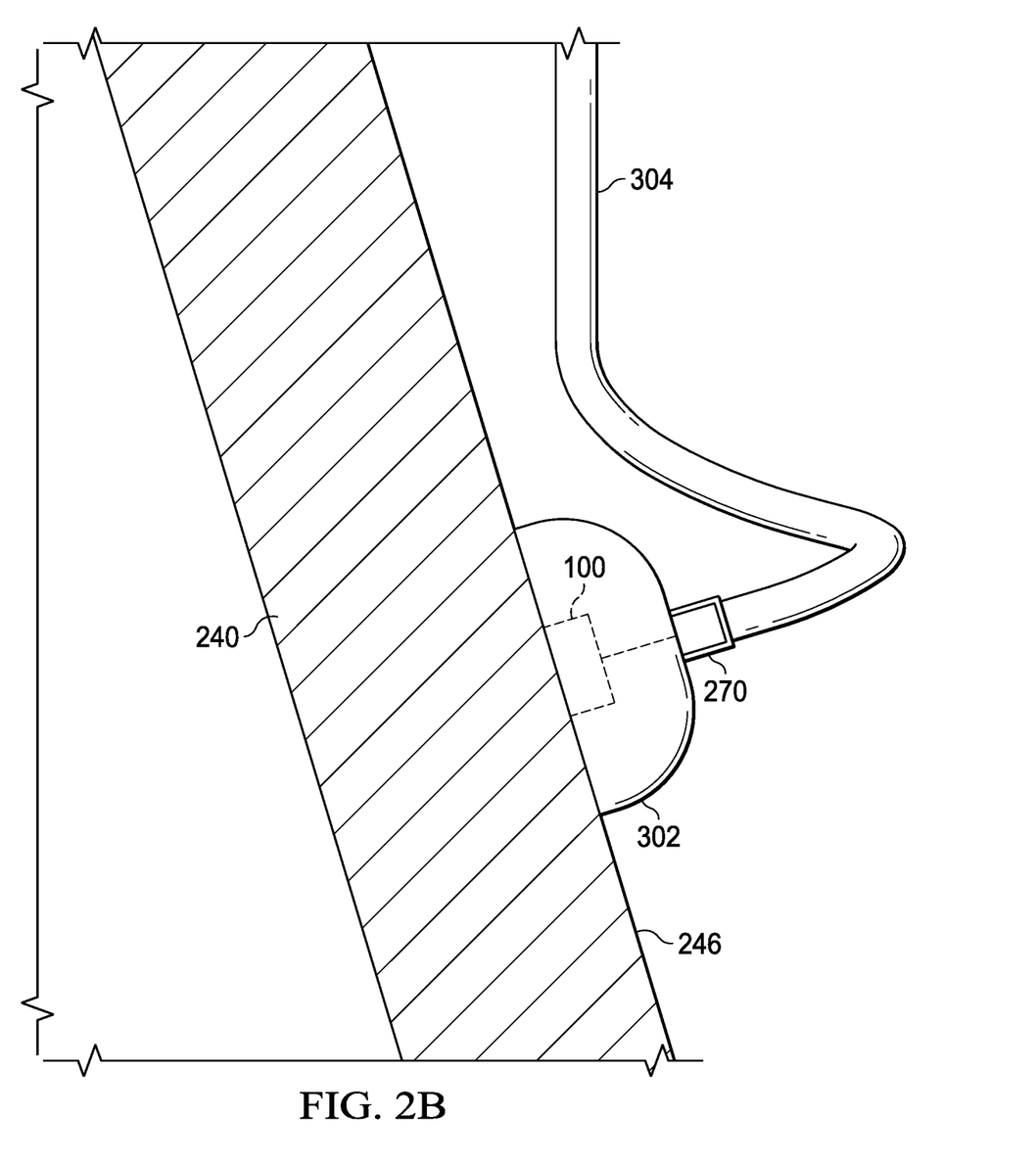
FIG. 2B is a schematic drawing of an example sensor capsule for enclosing the vibration sensor of FIG. 1A.

In some embodiments, as shown in FIGS. 1A and 2B, the resonant layer 104b is disposed on the substrate 104a in the form of an array of discrete portions of the electrically conductive nanomaterial disposed on a surface of the substrate 104a. In some embodiments, the resonant layer 104b is configured to resonate at various frequencies, for example, such that the vibration sensor 100 can sense vibrations of different components of an operating pump. In some embodiments, the resonant layer 104b is disposed on the substrate 104a by a photolithography technique, ion etching, sputter deposition, inkjet printing, or screen printing.

The transmission line 108 is configured to transmit a resonating response of the responsive patch 104 to the RF resonance detector 106. The RF resonance detector 106 is configured to detect the resonating response of the responsive patch 104 transmitted by the transmission line 108. In some embodiments, the RF interrogator 102 and the RF resonance detector 106 are parts of an RF network analyzer, which can be a scalar or vector type analyzer. In such embodiments, the RF network analyzer both produces the electromagnetic interrogation pulse and detects the resonating response of the responsive patch 104. The RF network analyzer can excite, via the RF interrogator 102, the responsive patch 104 with the electromagnetic interrogation pulse (RF signal) propagating at a frequency of interest (for example, 2.4 GHz), and then the resonating response of the responsive patch 104 is detected by the RF network analyzer via the RF resonance detector 106. The resonating response of the responsive patch 104 will exhibit a phase, amplitude, and resonance shift in comparison to the original interrogation pulse based on the composition and dimensions of the responsive patch 104. The RF resonance detector 106 can detect the phase, amplitude, and resonance shifts and can measure scattering parameters (S-parameters) of the resonating response of the responsive patch 104, such as return loss. The measured return loss can be correlated to vibration behavior. In some embodiments, the RF interrogator 102 and the RF resonance detector 106 are connected to the responsive patch 104 by SubMiniature version A (SMA) connectors.

Figure 1B:
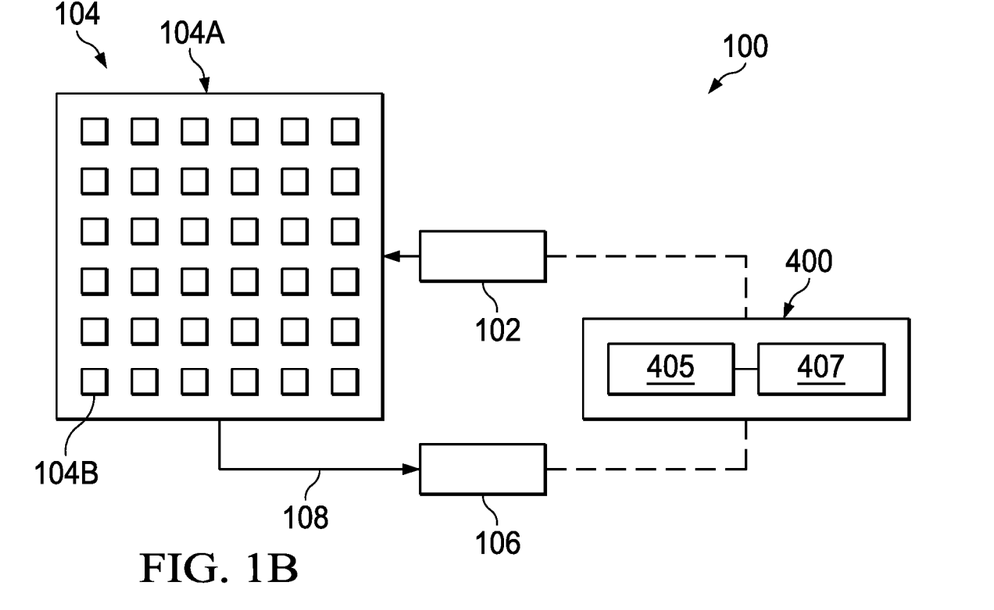
FIG. 1B is a schematic diagram of the vibration sensor of FIG. 1A including a computer system.
Figure 4:
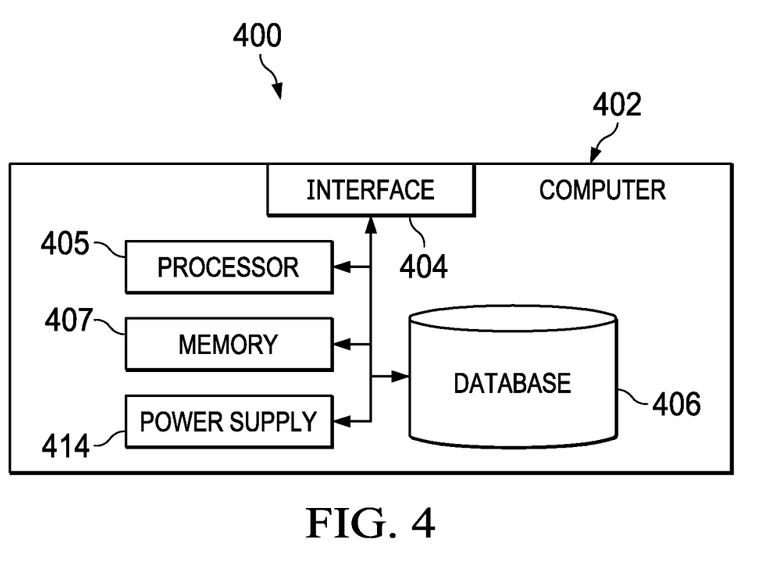
FIG. 4 is a block diagram of an example computer system that can be included in the vibration sensor of FIG. 1A.

In some embodiments, as shown in FIG. 1B, the vibration sensor 100 includes a computer system 400. The computer system 400 can be communicatively coupled to the RF resonance detector 106. For example, the computer system 400 can be connected to the RF resonance detector 106 by a wired connection or a wireless connection. The computer system 400 includes a processor 405 and a memory 407. The memory is coupled to the processor 405 and stores programming instructions for execution by the processor 405. The programming instructions instruct the processor 405 to perform various operations. An example of the computer system 400 is also shown in FIG. 4 and described in more detail later. The operations can include receiving the resonating response from the RF resonance detector 106. The operations can include processing the resonating response to determine a vibrational strain (that is, strain caused by vibration) of the resonant layer 104b. The operations can include comparing the determined vibrational strain with various vibrational strain signatures to determine whether the determined vibrational strain matches any of the vibrational strain signatures. The resonating response can be analyzed by the processor 405 by correlating a mechanical change to an electrical length change of the resonant layer 104b and then correlating the electrical length change to a resonance shift signature (vibrational strain signature). Electrical length is related to the resonance frequency of the resonant layer 104b. For example, a resonant layer 104b with a physical length of five centimeters can resonate at a frequency of 2.4 GHz.

Some examples of vibrational strain signatures that can be stored in the memory 407 and be compared with the determined vibrational strain include a vibrational strain signature attributed to pump cavitation, a vibrational strain signature attributed to pump rotor imbalance, a vibrational strain signature attributed to mechanical wear of bushing(s) (such as line shaft bushings), a vibrational strain signature attributed to mechanical wear of bearing(s) (such as bottom bearings), a vibrational strain signature attributed to rubbing between adjacent pump components, and a vibrational strain signature attributed to vertical pump column/mechanical resonance. Vibration data can be collected with different classes to represent a pump's condition (normal operation vs faults-based operation). Data can be collected from real field scenarios or synthesized in lab to simulate all possible failure modes. Comparing vibration response to the "baseline" or normal vibration response can indicate the severity of the vibration, and the frequency can determine the possible failure mechanism. In some embodiments, vibration amplitudes acquired at both the bottom impeller location (for example, sensor 100 of FIG. 2A), and the top motor location (for example, sensor 290 of FIG. 2A) can be compared to more accurately determine the fault location. The operations can include transmitting a warning message (for example, to an operator control screen) in response to determining that the determined vibrational strain of the resonant layer 104b matches any of the vibrational strain signatures. An operator can then mitigate or eliminate the cause of the vibrational strain, which can, for example, extend the life of operating equipment and/or prevent the need for unplanned maintenance activities which can be costly and time-intensive.

A resonant structure can be described as an equivalent circuit of lumped inductors (L) and capacitors (C). In the case of a conductor, if there is a material within the conductor that causes additional capacitance, its presence will effectively increase an electrical length of the conductor, and the resonance of the conductor will decrease. In relation to the vibration sensor 100, vibrational strain conditions can impose additional capacitance and/or affect molecular interactions in the responsive patch 104, which can slow down the RF waveform and effectively increase the electrical length of the resonating structure (responsive patch 104).

For example, a resonant structure with an electrical length of λ/2 will exhibit resonance at a frequency which makes the electrical length of the line half of its wavelength. As velocity of propagation along the line decreases (meaning the wavelength along the line decreases at a given frequency), then the resonant frequency decreases. The proportional decrease in resonant frequency will be equal to the proportional decrease in velocity of propagation.

In some embodiments, the computer system 400 is communicatively coupled to the RF interrogator 102. For example, the computer system 400 can be connected to the RF interrogator 102 by a wired connection or a wireless connection. In such embodiments, the operations performed by the processor 405 can include causing the RF interrogator 102 to produce the electromagnetic interrogation pulse having the first frequency.

FIG. 2A is a schematic drawing of a vertical charge pump vibration monitoring system in accordance with an embodiment of the present disclosure, including the vibration sensor 100 and computer system 400 of FIG. 1B. Referring to FIG. 2A, vertical charge pump vibration monitoring system 200 includes a vertical charge pump assembly 202 that is configured to pump a fluid 201. In some embodiments, fluid 201 is a hydrocarbon fluid such as crude oil and vertical charge pump assembly 202 is a vertical crude oil charge pump. In other embodiments, fluid 201 can be a non-hydrocarbon fluid. In the illustrated embodiment, vertical charge pump assembly 202 is a "closed suction" or "canned" pump design. It will be understood that in other embodiments, the vertical charge pump assembly can be an "open suction" design.

Vertical charge pump assembly 202 includes a top or first end 204 and a bottom or second end 206. A top portion 208 of pump assembly 202 is adjacent to first end 204 and a bottom portion 210 of pump assembly 202 is adjacent to the second end 206. A separator plate 216 separates top portion 208 from bottom portion 210. Top portion 208 includes a motor 220. Motor 220 can be an electric motor or another suitable motor. Motor 220 is disposed within motor housing 221 and is connected to a top end of shaft 222. Within bottom portion 210, shaft 222 is disposed within a central passageway 226, which is surrounded by pressure casing 224. Second end 206 includes pump inlet 250.

Within bottom portion 210, the bottom end of shaft 222 is connected to one or more impellers disposed within respective bowl casings. In the illustrated embodiment, the bottom portion 210 includes three such impellers: lower impeller 230 (which may be referred to as the first-stage impeller), intermediate impeller 232, and upper impeller 234, disposed within lower (or first-stage) bowl casing 240, intermediate bowl casing 242, and upper bowl casing 244, respectively. In some embodiments, the pump assembly includes a different number of impellers and corresponding bowl casings, such as, for example, in some embodiments, only one impeller and corresponding bowl casing, or, in other embodiments, four or a greater number of impellers and corresponding bowl casings. Top bushing 215, line-shaft bushings 223, and bottom bushing 225 provide alignment and bearing surfaces for shaft 222. Coupling 214 connects the shaft of motor 220 with pump shaft 222.

In the illustrated embodiment, bottom portion 210 is disposed within a can 212 which is sunk into a concrete foundation 260. In operation, fluid 201 enters vertical charge pump assembly 202 at suction nozzle 252 and fills can 212, thereby immersing pump inlet 250 in fluid and at least partially immersing lower bowl casing 240, intermediate bowl casing 242, and upper bowl casing 244. Motor 220 rotates shaft 222 which in turn rotates impellers 230, 232, and 234, thereby pumping fluid 201 into pump inlet 250 and upwards through central passageway 226 and out of discharge nozzle 254. In some embodiments, instead of can 212 within concrete foundation 260, bottom portion 208 can be disposed within a tank, pit, borehole, or other fluid-filled cavity or container to pump fluid from such cavity or container.

Vertical charge pump vibration monitoring system 200 further includes vibration sensor 100 (as described in reference to FIG. 1A) disposed on an external surface 246 of bottom portion 208, on or proximate to one of the bowl casings and the pump inlet 250. In the illustrated embodiment, external surface 246 is an external surface of lower bowl casing 240. In some embodiments, the external surface on which vibration sensor 100 is disposed can be a different surface of bottom portion 208. In some embodiments, other sensors can be attached on external surface 246 instead of or in addition to vibration sensor 100. Such other or additional sensors can include (but are not limited to) accelerometers (such as the A0710GP accelerometer available from Emerson), RF waveguide/antenna impedance sensors, an optical fiber sensors, and/or a MEMS piezoresistive sensors.

In the illustrated embodiments, vibration monitoring system 200 further includes an top portion vibration sensor 290 disposed on motor housing 221. In some embodiments, top portion vibration sensor 290 can comprise nanomaterial RF vibration sensor similar to vibration sensor 100 or can comprise a conventional vibration sensor. In some embodiments, additional suitable sensor(s) can be disposed on the top portion 208, for example on or near a top pump shaft bearing.

Vertical charge pump vibration monitoring system 200 further includes computer system 400, as described in more detail in reference to FIG. 1B and FIG. 4. Cable 270 or another suitable wired or wireless connection connects sensor 100 with computer system 400. Likewise, cable 292 or another suitable wired or wireless connection connects top portion vibration sensor 290 with computer system 400. Cable 270 and cable 292 can comprise coaxial cables, optical fiber cables, hollow waveguides, or other suitable cables.

FIG. 2B is a schematic drawing of an example sensor capsule for enclosing the vibration sensor 100 of FIG. 1A in accordance with an embodiment of the present disclosure. Referring to FIG. 2B, vibration sensor 100 is attached to an outer surface 246 of the bottom portion of the vertical charge pump assembly, and specifically in the illustrated embodiment, on an outer surface of lower bowl casing 240, as also described in reference to FIG. 2A. Sensor capsule 302 comprises a cover attached to outer surface 246, defining a capsule interior volume within which vibration sensor 100 is positioned, thereby isolating vibration sensor 100 from fluid (such as fluid 201 of FIG. 2A). In some embodiments, vibration sensor 100 is enclosed by, but does not touch, sensor capsule 302. Such encapsulation can protect vibration sensor 100 and reduce the danger from electrical or thermal energy (such as ignition of fluid from heat or sparks), without interfering with the operation of vibration sensor 100. Sensor capsule 302 is connected to tube 304 which provides a passageway for cable 270 which is attached to vibration sensor 100 and, as shown in FIG. 2A, connects vibration sensor 100 to computer system 400 (not shown in FIG. 2B). Sensor capsule 302 and tube 304 can be made of high-temperature thermoplastic rubber or polymer materials, or other suitable flexible, abrasion-resistant materials.

Figure 3A:
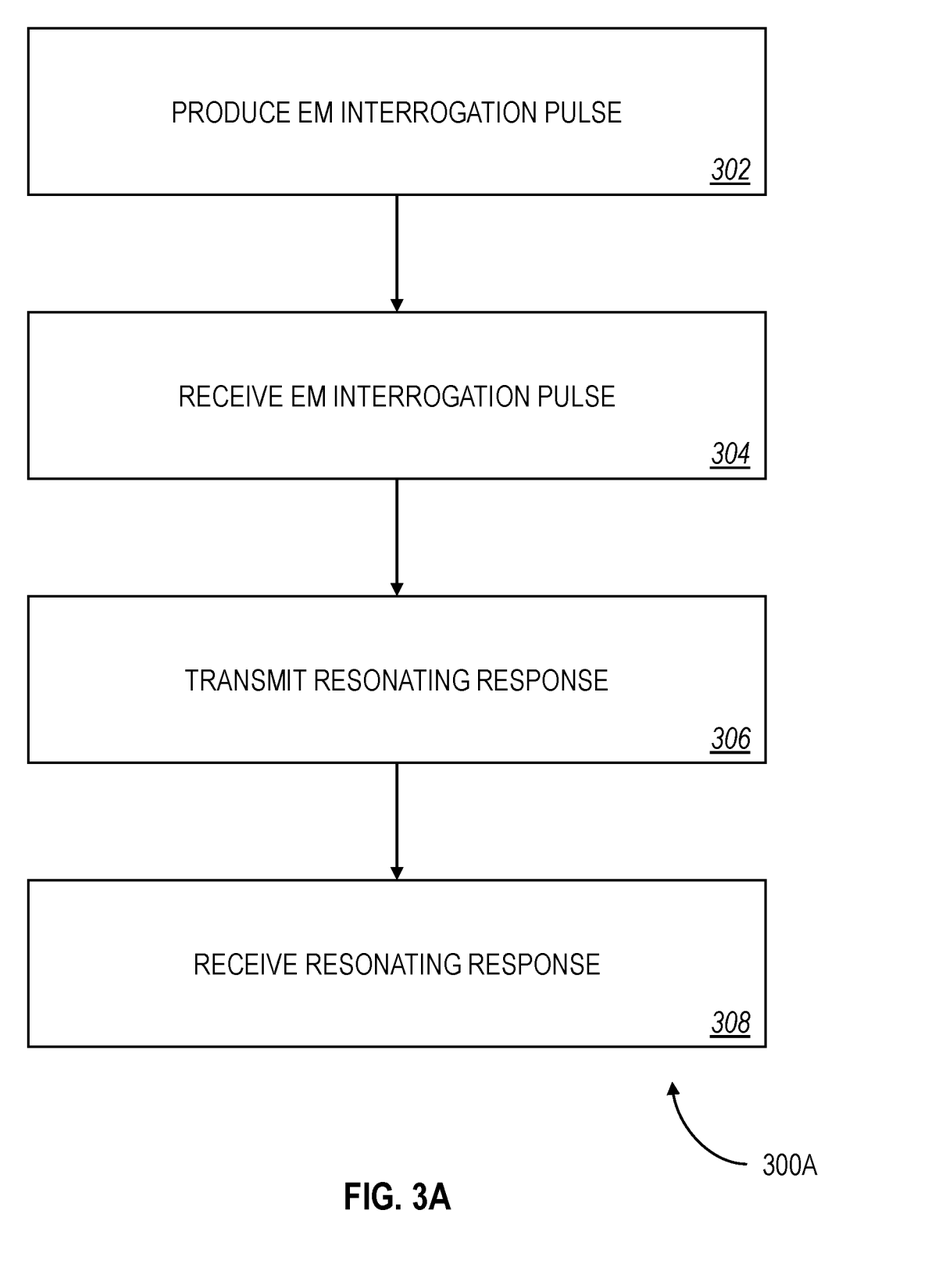
FIG. 3A is a flow chart of an example method for using the vibration sensor of FIG. 1A.

FIG. 3A is a flow chart of a method 300A that can be implemented to sense vibrations in operating equipment, for example, the vertical charge pump 200. For example, method 300A can be implemented by the vibration sensor 100. At step 302, an electromagnetic interrogation pulse having a first frequency is produced by an RF interrogator (such as the RF interrogator 102).

At step 304, the electromagnetic interrogation pulse from the RF interrogator 102 is received by a resonant layer of a responsive patch (such as the resonant layer 104b of the responsive patch 104). The resonant layer 104b resonates at the first frequency in response to receiving the electromagnetic interrogation pulse at step 304.

At step 306, a resonating response of the responsive patch 104 is transmitted by a transmission line (such as the transmission line 108) that couples the responsive patch to an RF resonance detector (such as the RF resonance detector 106). The resonating response of the responsive patch 104 is transmitted by the transmission line 108 to the RF resonance detector 106 at step 306.

At step 308, the resonating response of the responsive patch 104 is received (detected) by the RF resonance detector 106.

Figure 3B:
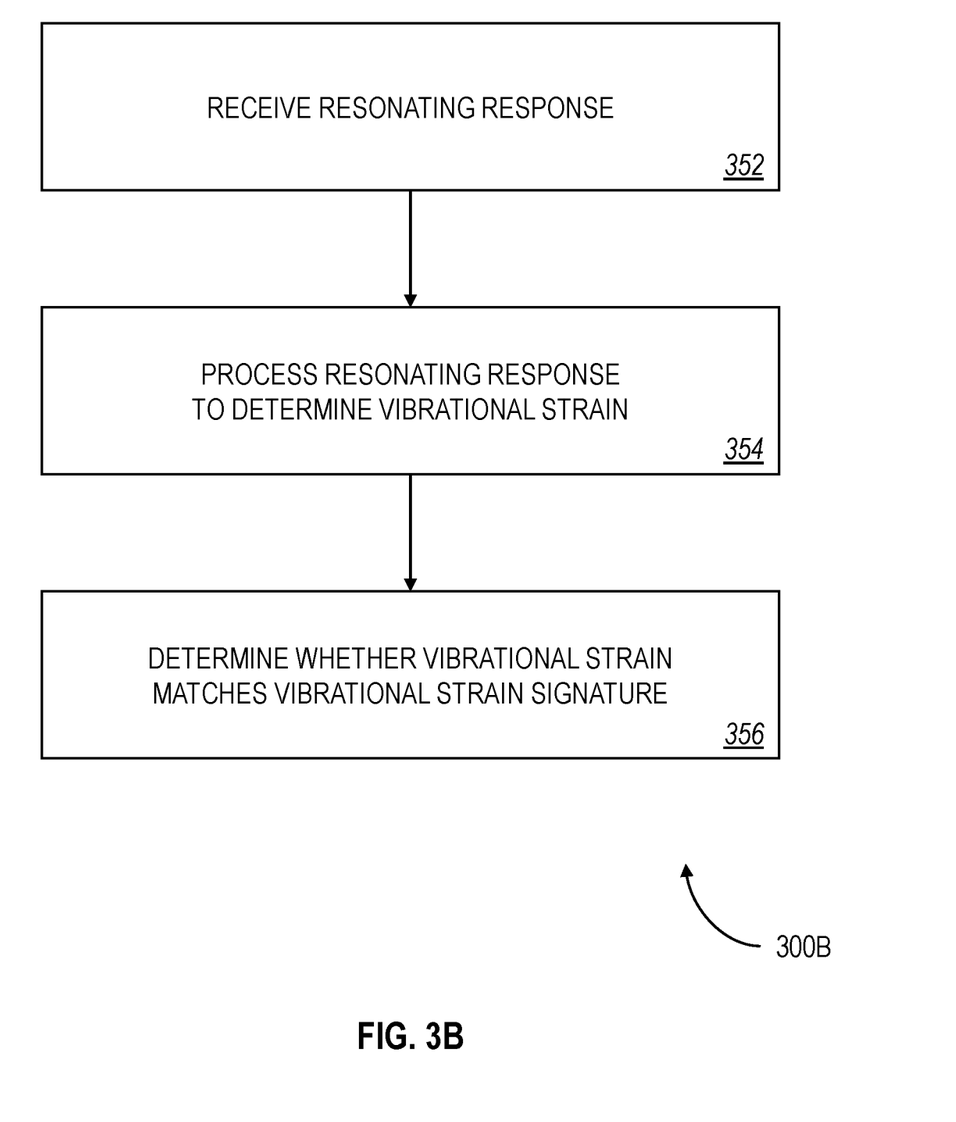
FIG. 3B is a flow chart of an example method that can be implemented by the computer system of FIG. 1B.

FIG. 3B is a flow chart of a method 300B that can be implemented by the computer system 400. For example, computer system 400 can implement method 300B to control the vibration sensor 100 and process data obtained by the vibration sensor 100. In some embodiments, method 300A includes an embodiment of method 300B. For example, method 300A can include any of the steps of method 300B.

At step 352, the resonating response from the RF resonance detector 106 is received by one or more processors (such as the processor 405). At step 354, the resonating response is processed by the processor 405 to determine a vibrational strain of the resonant layer 104b. At step 356, the determined vibrational strain is compared by the processor 405 with various vibrational strain signatures to determine whether the determined vibrational strain matches any of the vibrational strain signatures. In some embodiments, the method 300B includes transmitting, by the processor 405, a warning message in response to determining that the determined vibrational strain of the resonant layer 104b matches any of the vibrational strain signatures at step 356.

FIG. 4 is a block diagram of the computer system 400 used to provide computational functionalities associated with described algorithms, methods, functions, processes, flows, and procedures, as described in this specification, according to an embodiment. As mentioned previously, the vibration sensor 100 can include the computer system 400. The illustrated computer 402 is intended to encompass any computing device such as a server, desktop computer, laptop/notebook computer, one or more processors within these devices, or any other processing device, including physical or virtual instances (or both) of the computing device. Additionally, the computer 402 can include a computer that includes an input device, such as a keypad, keyboard, touch screen, or other device that can accept user information, and an output device that conveys information associated with the operation of the computer 402, including digital data, visual, audio information, or a combination of information.

The computer 402 includes an interface 404. Although illustrated as a single interface 404 in FIG. 4, two or more interfaces 404 may be used according to particular needs, desires, or particular embodiments of the computer 402. Although not shown in FIG. 4, the computer 402 can be communicably coupled with a network. The interface 404 is used by the computer 402 for communicating with other systems that are connected to the network in a distributed environment. Generally, the interface 404 comprises logic encoded in software or hardware (or a combination of software and hardware) and is operable to communicate with the network. More specifically, the interface 404 may comprise software supporting one or more communication protocols associated with communications such that the network or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular embodiments of the computer 402. Generally, the processor 405 executes instructions and manipulates data to perform the operations of the computer 402 and any algorithms, methods, functions, processes, flows, and procedures as described in this specification.

The computer 402 can also include a database 406 that can hold data for the computer 402 or other components (or a combination of both) that can be connected to the network. Although illustrated as a single database 406 in FIG. 4, two or more databases (of the same or combination of types) can be used according to particular needs, desires, or particular embodiments of the computer 402 and the described functionality. While database 406 is illustrated as an integral component of the computer 402, database 406 can be external to the computer 402.

The computer 402 also includes a memory 407 that can hold data for the computer 402 or other components (or a combination of both) that can be connected to the network. The memory 407 is a computer-readable storage medium. Although illustrated as a single memory 407 in FIG. 4, two or more memories 407 (of the same or combination of types) can be used according to particular needs, desires, or particular embodiments of the computer 402 and the described functionality. While memory 407 is illustrated as an integral component of the computer 402, memory 407 can be external to the computer 402. The memory 407 can be a transitory or non-transitory storage medium.

The memory 407 stores computer-readable instructions executable by the processor 405 that, when executed, cause the processor 405 to perform operations, such as any of the steps of method 300B. The computer 402 can also include a power supply 414. The power supply 414 can include a rechargeable or non-rechargeable battery that can be configured to be either user- or non-user-replaceable. The power supply 414 can be hard-wired. There may be any number of computers 402 associated with, or external to, a computer system containing computer 402, each computer 402 communicating over the network. Further, the term "client," "user," "operator," and other appropriate terminology may be used interchangeably, as appropriate, without departing from this specification. Moreover, this specification contemplates that many users may use one computer 402, or that one user may use multiple computers 402.

While this specification contains many specific embodiment details, these should not be construed as limitations on the scope of what may be claimed, but rather as descriptions of features that may be specific to particular embodiments. Certain features that are described in this specification in the context of separate embodiments can also be implemented, in combination, in a single embodiment. Conversely, various features that are described in the context of a single embodiment can also be implemented in multiple embodiments, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "nanoscale" refers to a scale on the order of 1 micrometer (1000 nanometers) or less. For example, nanoscale includes sizes ranging from 1 nanometer up to 1000 nanometers. The term "nanomaterial" refers to a material with a dimension (for example, a maximum or average dimension) in a range of from 1 nanometer to 1000 nanometers. Further, the term "nanoparticle" refers to a particle with a dimension (for example, a maximum or average dimension) in a range of from 1 nanometer to 1000 nanometers. A dimension can be, for example, diameter, length, width, height, or thickness.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described embodiments should not be understood as requiring such separation or integration in all embodiments, and it should be understood that the described components and systems can generally be integrated together or packaged into multiple products.

Accordingly, the previously described example embodiments do not define or constrain the present disclosure. Other changes, substitutions, and alterations are also possible without departing from the spirit and scope of the present disclosure.

What is claimed is:

1. A system comprising:
 a vertical charge pump configured to boost pressure of crude oil in crude oil transportation;
 a sensor comprising:
  a radio frequency interrogator configured to produce an electromagnetic interrogation pulse having a first frequency;
  a responsive patch disposed on a surface of the vertical charge pump, the responsive patch comprising:
   a substrate comprising a polymer; and
   a resonant layer disposed in an electrically insulating matrix, the electrically insulating matrix disposed on a surface of the substrate, the resonant layer comprising an electrically conductive nanomaterial, wherein the resonant layer is configured to resonate at the first frequency in response to receiving the electromagnetic interrogation pulse;
  a radio frequency resonance detector configured to detect a resonating response of the responsive patch;
  a transmission line coupling the responsive patch to the radio frequency resonance detector, the transmission line configured to transmit the resonating response of the responsive patch to the radio frequency resonance detector; and
 a computer system communicatively coupled to the radio frequency interrogator and the radio frequency resonance detector, the computer system comprising:
  one or more processors; and
  a non-transitory computer-readable storage medium coupled to the one or more processors and storing programming instructions for execution by the one or more processors, the programming instructions instructing the one or more processors to perform operations comprising:
   causing the radio frequency interrogator to produce the electromagnetic interrogation pulse having the first frequency;
   receiving the resonating response from the radio frequency resonance detector;
   processing the resonating response to determine a vibrational strain of the resonant layer;
   comparing the determined vibrational strain with a plurality of vibrational strain signatures to determine whether the determined vibrational strain matches any one of the plurality of vibrational strain signatures; and
   transmitting a warning message in response to determining that the determined vibrational strain of the resonant layer matches any one of the plurality of vibrational strain signatures, indicating that the vertical charge pump is in a warning condition.

2. The system of claim 1, wherein the electrically conductive nanomaterial comprises carbon nanotubes or silver nanoparticles.

3. The system of claim 2, wherein the substrate comprises solid copper.

4. The system of claim 2, wherein the polymer is polydimethylsiloxane.

5. The system of claim 4, wherein the resonant layer is disposed in an electrically insulating matrix comprising poly(methyl methacrylate), and the electrically insulating matrix is disposed on the substrate.

6. The system of claim 2, wherein a thickness of the resonant layer varies along a first dimension.

7. The system of claim 6, wherein a length of the resonant layer varies along a second dimension.

8. The system of claim 2, wherein the electrically conductive nanomaterial of the resonant layer is coated on the substrate.

9. The system of claim 1, wherein the computer system is communicatively coupled to the radio frequency interrogator, and the programming instructions instruct the one or more processors to perform operations comprising causing the radio frequency interrogator to produce the electromagnetic interrogation pulse having the first frequency.

10. The system of claim 9, wherein the programming instructions instruct the one or more processors to perform operations comprising transmitting a warning message in response to determining that the determined vibrational strain of the resonant layer matches any one of the plurality of vibrational strain signatures.

11. A method comprising:
producing, by a radio frequency interrogator, an electromagnetic interrogation pulse having a first frequency;
receiving, by a resonant layer of a responsive patch disposed on a surface of a vertical discharge pump configured to boost pressure of crude oil in crude oil transportation, the electromagnetic interrogation pulse from the radio frequency interrogator, wherein the resonant layer resonates at the first frequency in response to receiving the electromagnetic interrogation pulse, the responsive patch comprises a substrate, the resonant layer is disposed on a surface of the substrate comprising a polymer, and the resonant layer comprises an electrically conductive nanomaterial;
transmitting, by a transmission line that couples the responsive patch to a radio frequency resonance detector, a resonating response of the responsive patch to the radio frequency resonance detector;
detecting, by the radio frequency resonance detector, the resonating response of the responsive layer;
receiving the resonating response from the radio frequency resonance detector;
processing the resonating response to determine a vibrational strain of the resonant patch;
comparing the determined vibrational strain with a plurality of vibrational strain signatures to determine whether the determined vibrational strain matches any one of the plurality of vibrational strain signatures; and
transmitting a warning message in response to determining that the determined vibrational strain of the resonant layer matches any one of the plurality of vibrational strain signatures, indicating that the vertical charge pump is in a warning condition.

12. The method of claim 11, wherein the electrically conductive nanomaterial comprises carbon nanotubes or silver nanoparticles.

13. The method of claim 12, wherein the polymer is polydimethylsiloxane.

14. The method of claim 13, wherein the resonant layer is disposed in an electrically insulating matrix comprising poly(methyl methacrylate), and the electrically insulating matrix is disposed on the substrate.

15. The method of claim 12, wherein the electrically conductive nanomaterial of the resonant layer is coated on the substrate.

16. The method of claim 12, comprising causing, by one or more processors, the radio frequency interrogator to produce the electromagnetic interrogation pulse having the first frequency.

17. The method of claim 11, comprising transmitting, by the one or more processors, a warning message in response to determining that the determined vibrational strain of the resonant layer matches any one of the plurality of vibrational strain signatures.

* * * * *